United States Patent
Krochik et al.

(10) Patent No.: US 10,681,002 B2
(45) Date of Patent: Jun. 9, 2020

(54) INTERNET OF THINGS (IOT) MEDIATION AND ADAPTATION SECURE APPLICATION GATEWAY

(71) Applicant: Konica Minolta Laboratory U.S.A., Inc., San Mateo, CA (US)

(72) Inventors: Ghenya Krochik, San Mateo, CA (US); Rahul Suraparaju, San Mateo, CA (US); Maria Perez, Half Moon Bay, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 247 days.

(21) Appl. No.: 15/828,058

(22) Filed: Nov. 30, 2017

(65) Prior Publication Data

US 2019/0166088 A1 May 30, 2019

(51) Int. Cl.
| | |
|---|---|
| G06F 15/16 | (2006.01) |
| H04L 29/12 | (2006.01) |
| H04L 29/08 | (2006.01) |
| H04L 12/24 | (2006.01) |
| H04W 4/80 | (2018.01) |

(52) U.S. Cl.
CPC ...... *H04L 61/2007* (2013.01); *H04L 41/0876* (2013.01); *H04L 61/2092* (2013.01); *H04L 67/12* (2013.01); *H04W 4/80* (2018.02); *H04L 61/6004* (2013.01); *H04L 61/6022* (2013.01); *H04L 61/6059* (2013.01)

(58) Field of Classification Search
CPC ............ H04L 41/0876; H04L 61/2007; H04L 61/2092; H04L 61/6004; H04L 61/6022; H04L 61/6059; H04L 67/12; H04W 4/80
See application file for complete search history.

(56) References Cited

U.S. PATENT DOCUMENTS

| | | |
|---|---|---|
| 8,516,141 B2 | 8/2013 | Perez |
| 2018/0288179 A1* | 10/2018 | Bhatia ..................... H04L 45/00 |
| 2019/0158975 A1* | 5/2019 | Petersen ................. H04L 69/18 |

OTHER PUBLICATIONS

Zachariah, T. et al., "The Internet of Things Has a Gateway Problem", HOTMOBILE '15, 6 pages, Feb. 12-13, 2015.

* cited by examiner

*Primary Examiner* — Normin Abedin

(74) *Attorney, Agent, or Firm* — Buchanan Ingersoll & Rooney PC

(57) ABSTRACT

A method, non-transitory computer readable medium, and a primary server are disclosed for transferring data over a communication network from an Internet of Things (IoT) device. The method include receiving a data packet from the IoT device on an application running on a primary server, the data packet having a stateless autoconfiguration IPv6 address, which is configured at least partially based on a device identifier assigned to the IoT device; modifying the stateless autoconfiguration IPv6 address associated with the IoT device identifier to generate a global IP address with the application running on the primary server; and sending the data packet with the global IP address from the primary server to one or more secondary servers over the communication network.

20 Claims, 12 Drawing Sheets

S106 : Table managed in S106

| Requesting device Link-local address | Assigned Global address | Destination address | Current application protocol | Inactive Times (ms) |
|---|---|---|---|---|
| Fe80::2 | 2002::x2 | 2002::9 | CoAP | |
| Fe80::4 | 2002::x4 | 2002::A | MQTT | |
| Fe80::5 | 2002::x5 | 2002::B | AMQP | |
| ⋮ | ⋮ | ⋮ | ⋮ | ⋮ |

1300
1310
1320
1330
1340
1350

Table for determining the inactive time

| Application protocol | Inactive Times (ms) |
|---|---|
| CoAP | |
| MQTT | |
| AMQP | |
| ⋮ | ⋮ |

FIG. 13

| Requesting device Link-local address | Receiving I/F Link local address | MFP Global address | | Determined Global address |
|---|---|---|---|---|
| Fe80::2 | Fe80::6 | 2002::9 | | 2002::x2 |
| Fe80::3 | Fe80::6 | 2002::9 | | 2002::x3 |
| Fe80::4 | Fe80::7 | 2002::9 | | 2002::x4 |
| Fe80::5 | Fe80::8 | 2002::9 | | 2002::x5 |

1410 → Requesting device Link-local address; 1420 → Receiving I/F; 1430 → MFP Global address; 1400, 1440 → Determined Global address

FIG. 14

| Requesting device Link-local address | Receiving I/F Link local address | MFP Global address | | Determined Global address |
|---|---|---|---|---|
| Fe80::2 | Fe80::6 | 2002::9 | | 2002::x6 |
| Fe80::4 | Fe80::7 | 2002::9 | | 2002::x7 |
| Fe80::5 | Fe80::8 | 2002::9 | | 2002::x8 |

| Requesting device Link-local address | Receiving I/F Link local address | MFP Global address | | Determined Global address |
|---|---|---|---|---|
| Fe80::2 | Fe80::6 | 2002::9 | | 2002::x9 |

1410, 1420, 1430, 1600, 1640

FIG. 16 ures) can configure themselves automatically (i.e., stateless address autoconfiguration) when connected to an IPv6 network using ICMPv6 neighbor discovery messages. When first connected to a network, an IPv6 host sends a link-local multicast neighbor solicitation request advertising its tentative link-local address for double address detection (dad) if no problem is encountered the host uses the link-local address. The router solicitations are sent (or router advertisements are received depending on timing) to obtain network-layer configuration parameters, routers respond to such a request with a router advertisement packet that contains network-layer configuration parameters.

INTERNET OF THINGS (IOT) MEDIATION AND ADAPTATION SECURE APPLICATION GATEWAY

FIELD OF THE INVENTION

The present disclosure relates to a local network with an Internet of Things (IoT) mediation and adaptation gateway for converting local data into global data, and more particularly, to an IoT mediation and adaptation gateway, which can include an Internet Protocol Version 6 (IPv6) only IoT bus configured to host link-local addresses, and wherein the link-local addresses can be translated to global IP addresses.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (for example, packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages. When first connected to a network, an IPv6 host sends a link-local multicast neighbor solicitation request advertising its tentative link-local address for double address detection (dad) if no problem is encountered the host uses the link-local address. The router solicitations are sent (or router advertisements are received depending on timing) to obtain network-layer configuration parameters, routers respond to such a request with a router advertisement packet that contains network-layer configuration parameters.

Most network interfaces come with an embedded IEEE Identifier (i.e., a link-layer MAC address), and in those cases, stateless address autoconfiguration uses the IEEE identifier to generate a 64-bit interface identifier. By design, the interface identifier is likely to be globally unique when generated in this fashion. The interface identifier is in turn appended to a prefix to form the 128-bit IPv6 address. The first-half 64 bits are allocated to a network prefix included in router advertisement (RA) from the router. The second-half 64 bits are allocated to a EUI-64 format interface ID as a 64-bit identifier decided by the IEEE. In the EUI-64 format interface ID, the Media Access Control address (MAC address) is encapsulated. In 64 bits of the entire interface ID, the first 24 bits are allocated to a number indicating a manufacturer administrated by the IEEE, the next 16 bits are allocated to "FFFE", and the last 24 bits are allocated to an expanded identification number managed by the manufacturer.

For example, IPv6 capable device with stateless addressing including image forming apparatuses (for example, Multi-Function Peripherals (MFP) and printers) typically will include a unique identifier or media access control address (MAC address). The MAC address is assigned to network adapters or network interface cards (NICs) by the manufacturer for identification, and used in the Media Access Control protocol sublayer of the Internet Protocol Version 6 (IPv6). If assigned by the manufacturer, a MAC address usually encodes the manufacturer's registered identification number. It can be appreciated that the MAC address can also be known as an Ethernet Hardware Address (EHA), hardware address, adapter address, or physical address.

When using the protocol stateless addressing for IPv6, which is required by the IPv6 Ready Logo Program, both link-local addresses and global addresses are determined by concatenating an identifier unique to the network adapter (or network interface card) of the device. However, since the MAC ID does not change as long as the physical hardware adapter is not changed, the use of the MAC ID for generating IPv6 addresses could subject the apparatus or device to additional security risks.

In addition, emerging and competing networking technologies are being adopted within the IoT space. While these multiple technologies are being offered by various vendors, and which are aimed at different vertical markets like home automation, healthcare, or industrial IoT, each of the multiple technologies provide alternative implementations of the same standard protocols. This results in having to have some kind of proprietary application gateways in each of the variant set of technologies applicable for each vertical market in order to achieve the end-to-end integration of this IPv6 enabled IoT peripheral subnets with the Internet.

However, proprietary application gateway can have drawbacks. For example, proprietary application gateways may not offer energy efficiency to low energy IoT devices, for example, Bluetooth® Low Energy (Bluetooth-LE or BT-LE) devices aimed at applications in the healthcare, fitness, beacons, security, and home entertainment industries, this solution does may not scale with today's fast-paced technology creating a need for a set of proprietary gateways to support each and every IoT technology used in the IoT peripheral. For example, Bluetooth Low Energy can provide considerably reduced power consumption and cost while maintaining a similar communication range. In addition, every time a new applicable IoT technology comes to market, there may be a need for a new corresponding proprietary application gateway that handle the new technology and can cause longer downtime.

SUMMARY OF THE INVENTION

In consideration of the above issues, it would be desirable to have a method and system for converting local data into global data, and more particularly, to an IoT mediation and adaptation gateway (or application gateway), which can include an Internet Protocol Version 6 (IPv6) only IoT bus configured to host link-local addresses, and wherein the link-local addresses can be translated to global addresses.

A method is disclosed for transferring data over a communication network from an Internet of Things (IoT) device, the method comprising: receiving a data packet from the IoT device on an application running on a primary server, the data packet having a stateless autoconfiguration IPv6 address, which is configured at least partially based on a device identifier assigned to the IoT device; modifying the stateless autoconfiguration IPv6 address associated with the IoT device identifier to generate a global IP address with the application running on the primary server; and sending the data packet with the global IP address from the primary server to one or more secondary servers over the communication network.

A non-transitory computer readable medium containing a computer program is disclosed for transferring data over a communication network from an Internet of Things (IoT) device, wherein the computer program comprises executable instructions for: receiving a data packet from the IoT device on an application running on a primary server, the data packet having a stateless autoconfiguration IPv6 address, which is configured at least partially based on a device identifier assigned to the IoT device; modifying the stateless autoconfiguration IPv6 address associated with the IoT device identifier to generate a global IP address with the application running on the primary server; and sending the data packet with the global IP address from the primary server to one or more secondary servers over the communication network.

A primary server is disclosed, which is configured to implement a method of for transferring data over a communication network from an Internet of Things (IoT) device, the primary server having an application configured to: receive a data packet from the IoT device on an application running on a primary server, the data packet having a stateless autoconfiguration IPv6 address, which is configured at least partially based on a device identifier assigned to the IoT device; modify the stateless autoconfiguration IPv6 address associated with the IoT device identifier to generate a global IP address with the application running on the primary server; and send the data packet with the global IP address from the primary server to one or more secondary servers over the communication network.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 13 is a table for recording communications from an IoT device in accordance with an exemplary embodiment.

FIG. 14 is a table for recording communications from an IoT device and configuring the global IP address for the IoT device in accordance with another exemplary embodiment.

FIG. 15 is a table for recording communications from an IoT device and configuring the global IP address for the IoT device in accordance with a further exemplary embodiment.

FIG. 16 is a table for recording communications from an IoT device and configuring the global IP address for the IoT device in accordance with an exemplary embodiment.

DETAILED DESCRIPTION

Figure 1:
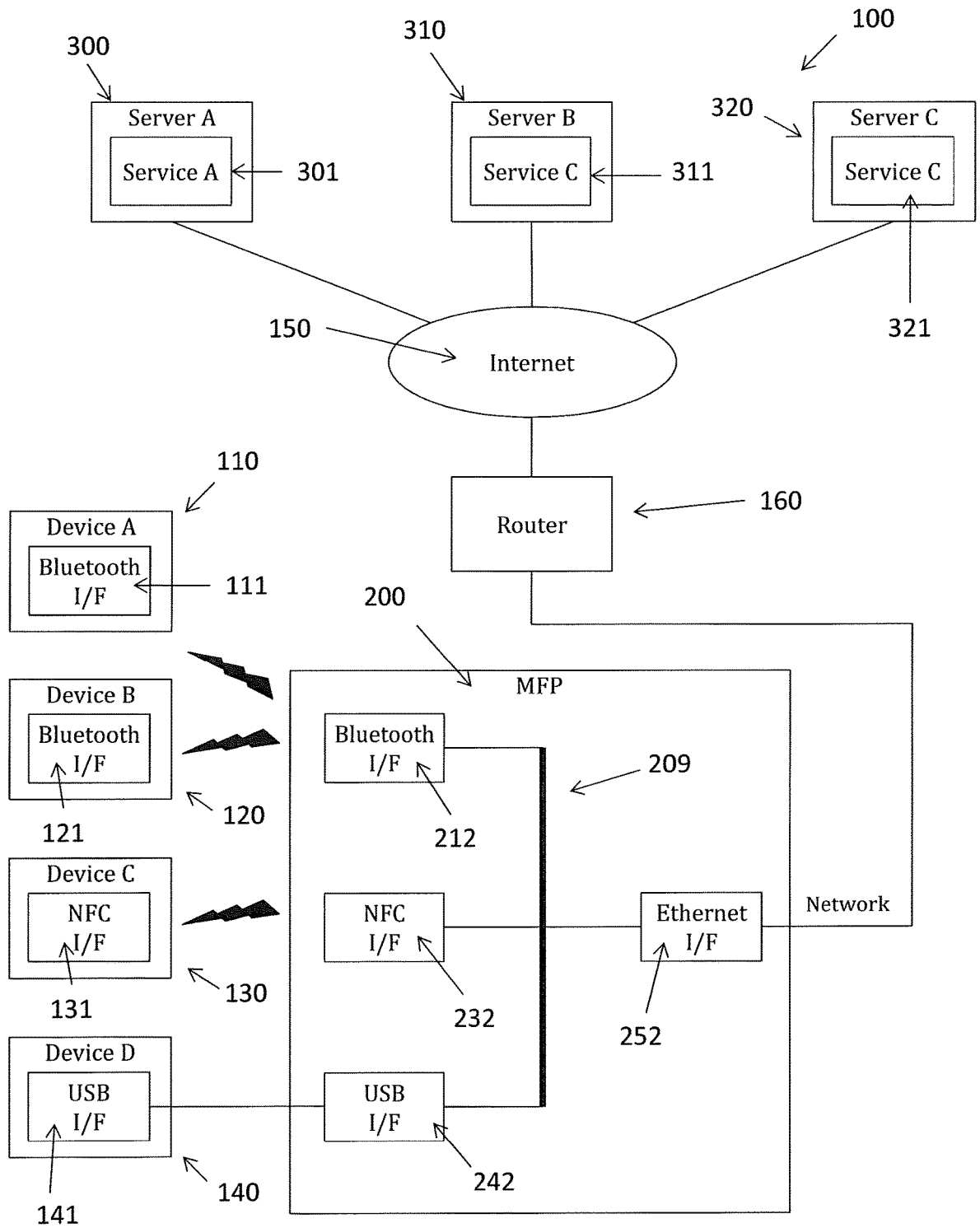
FIG. 1 is an illustration of a system having an Internet of Things (IoT) mediation and adaptation gateway in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 having an Internet of Things (IoT) mediation and adaptation secure gateway 500 (FIG. 5) in accordance with an exemplary embodiment. As shown in FIG. 1, the system 100 can include one or more IoT devices (or client devices) 110, 120, 130, 140, a multi-function peripheral (MFP) or primary server 200, a router 160, one or more secondary servers 300, 310, 320, and a communication network 150. In accordance with an exemplary embodiment, each of the one or more IoT devices (or client devices) 110, 120, 130, 140 is configured to communicate with the multi-function peripheral (MFP) or primary server 200 via a communication protocol, for example, Bluetooth®, Near-Field Communication (NFC), or Universal Serial Bus (USB). For example, each of the one or more devices 110, 120, 130, 140 can include an interface (I/F), which communicates with the MFP 200, for example, Bluetooth I/F 111, 121, NFC I/F 131, and USB I/F 141.

In accordance with an exemplary embodiment, the communication network or network 150 can be a public telecommunication line and/or a network (for example, LAN or WAN). Examples of the communication network 150 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, the MFP 200 can include a Bluetooth I/F 212, a NFC I/F 232, and a USB I/F 242, which are connected, for example, via a bus 209, to an Ethernet I/F 252, which communicates via the communication network 150 to the router 160 and the one or more secondary servers 300, 310, 320. Each of the one or more secondary servers 300, 310, 320, can include at least one service 301, 311, 321. In accordance with an exemplary embodiment, each of the at least one services 301, 311, 321, can provide various functionalities, such as sharing data or resources among multiple clients, or performing computation for a client. In accordance with an exemplary embodiment, the one or more secondary servers 300, 310, 320 can be, for example, database servers, file servers, mail servers, print servers, web servers, game servers, and/or application servers.

As shown in FIG. 1, the system and method disclosed herein can establish information access and allow data transfer from the IoT devices 110, 120, 130, 140, for example, from the IoT peripheral subnets to the one or more secondary servers 300, 310, 320, via the IoT mediation and adaptation gateway (application gateway) 500 without an Internet connection. For example, the system and method disclosed herein can be applied to devices having low-power wireless communications or wired communications, for example, Bluetooth® Low Energy (Bluetooth LE), Near-Field Communication (NFC), and USB Net, to access and/or provide information to the one or more secondary servers 300, 310, 320.

In accordance with an exemplary embodiment, Bluetooth LE, NFC, and USB Net are examples of low energy technologies, which can be implemented into IoT devices or client devices 110, 120, 130, 140 having applications related to the smart home, health, sport and fitness sectors, and which technologies are designed to have relatively low power requirements. For example, the IoT devices or client devices 110, 120, 130, 140 can operate for "months or years" on a button cell or coin-shaped cell, having a relatively small size and relatively low cost, and are configured, for example, to be compatible with a large installed base of mobile phones, tablets, and computers. Example of IoT devices 110, 120, 130, 140 can include watches, health and fitness monitors, and home and security systems.

Bluetooth is a radio communication technology that enables low-power, short distance wireless networking between Bluetooth-enabled devices. Bluetooth low energy (Bluetooth LE) is designed specifically for transferring small amounts of data infrequently at modest rates with relatively small energy expenditure per bit. In accordance with an exemplary embodiment, to establish a Bluetooth connection, the Bluetooth LE device 110, 120 has to be first paired with another device, for example, a client device, such as a smartphone, or alternatively, for example, a MFP (or primary server) 200. After the devices 110, 120, 200 are paired, the Bluetooth LE device 110, 120 can begin communication using network protocols that are part of Bluetooth specification.

Near-Field Communication (NFC) is a set of low-speed and short-range communication protocols that establish communication between two devices 130, 200 over radio waves. In NFC, there are no pairing needed to establish connection between devices 130, 200 and NFC can work in two modes to transfer data: passive (the initiator device provides a carrier field and the target device answers by modulating the existing field) and active (both initiator and target device communicate by alternately generating their own fields)

Universal Serial Bus (USB) is an industry standard that defines cables, connectors and communication protocols for connection, communication, and power supply between computers and devices. USB was designed to standardize the connection of computer peripherals (including keyboards, pointing devices, digital cameras, printers, portable media players, disk drives and network adapters) to personal computers, both to communicate and to supply electric power. It has largely replaced a variety of earlier interfaces, such as serial ports and parallel ports, as well as separate power chargers for portable devices, and has become commonplace on a wide range of devices. USB, unlike other forms of connectivity like Ethernet or Wi-Fi, is a direct point to point connection that can guarantee integrity and orderly delivery of data and packet transfers.

USB Network (or USB Net) is Ethernet-style networking over USB, and which protocols allow application-independent exchange of data with USB devices, instead of specialized protocols such as video or MTP. Even though USB is not a physical Ethernet, the networking stacks of all major operating systems are set up to transport IEEE 802.3 frames, without caring about the underlying transport. For example, the main industry protocols for USB Net can include Remote NDIS (RNDIS, a Microsoft® vendor protocol), Ethernet Control Model (ECM), Ethernet Emulation Model (EEM), and Network Control Model (NCM).

In accordance with an exemplary embodiment, Bluetooth LE, NFC, and USB Net technologies are exemplary examples of technologies that can perform local data access and transfer using IPv6 protocol for the communication. In addition, each of the above-described technologies uses an IPv6 over Low-Power Wireless Personal Area Networks (6LoWPAN) layer in the protocol stack, which enables the technologies to transmit IPv6 packets over a communication link. 6LoWPAN is the name of a concluded working group in the Internet area of the IETF. The 6LoWPAN concept originated from the idea that "the Internet Protocol could and should be applied even to the smallest devices," and that low-power devices with limited processing capabilities should be able to participate in the Internet of Things. The 6LoWPAN group has defined encapsulation and header compression mechanisms that allow IPv6 packets to be sent and received, for example, over IEEE 802.15.4 based networks. In accordance with an exemplary embodiment, the use of the IPv6 protocol can provide a method of addressing data packets based on the IPv6 protocol, which provides two types of addressing: link-local and global.

Link-local addresses allow communications between devices on a local link. Link-local addresses can be automatically configured on any interface and derived from the MAC address of the device 110, 120, 130, 140. Link-local addresses are not guaranteed to be unique beyond a single network segment; therefore, routers (for example, router 160) do not forward packets with link-local addresses. In IPv6, each IoT device 110, 120, 130, 140 must have a link-local address assigned to the IoT device 110, 120, 130, 140.

Global addresses (or global IP addresses) are routable addresses that are globally unique on the Internet 150. In IPv6, each IoT device 110, 120, 130, 140 can have zero or more global addresses assigned. However, proprietary application gateways mentioned above incur many drawbacks, for example security issues, energy efficiency of the low-energy IoT devices, and scalability with today's fast-paced technology. For example, security issues can include, a router with firewall playing a role of an IoT mediation gateway in the networks. Each host of the local network must have link-local address to send data over local links. Link-local addresses are not routable; therefore, each host must also have unique routable global address in order to send data over the Internet. In this case, for example, the router with a firewall can act as a mediation gateway.

Routers can manage IPv6 traffic by forwarding packets from the host to destination and firewalls protect hosts from the outside attacks. For example, when data is sent from the host with the global IP address, for example, 2001::/1 to the destination host with the global IP address, for example, 2002::/2, the router can play an important role of routing packets to the destination and receiving the response from the destination. When the router is waiting for a response from the destination, the router expects to receive packets from the IP address 2002::/2. In case, the response is received from any other IP address, those data packets will not pass the firewall (and may be dropped) and the router may not route the data packets back to the original host. In accordance with an exemplary embodiment, although routers with firewalls provide a way to protect data from the outside attacks, cyber-attacks are still a possibility since each host has a global address assigned to the device, which is used in the communication over the Internet based on MAC address.

Scalability with today's fast-paced technology, current solutions require or can require proprietary application gateways to support every IoT technology used. As a result, every time a new applicable IoT technology comes to market, there may be a need for a new corresponding proprietary application gateway to handle the new technology.

In accordance with an exemplary embodiment, a system and method are disclosed, which can include an IoT mediation and adaptation secure gateway (or application gateway) 500 (FIG. 5), which can help overcome drawbacks incurred with current practical approach being adopted by industry, by helping various IoT end devices integrate with the Internet 150. In accordance with an exemplary embodiment, the IoT mediation and adaptation secure gateway 500 can enable low energy IoT end devices to efficiently and seamlessly communicate with other devices as well as with applications and services that are running, for example, in one or the one or more secondary servers 300, 310, 320, and wherein, for example, the one or more secondary servers 300, 310, 320 are legacy servers and/or cloud servers. In accordance with an exemplary embodiment, the IoT devices (or client devices) 110, 120, 130, 140 can be devices, which use different protocols at Layer1 (physical layer) and Layer2 (data link) of the protocol stack, and the application resulting through this disclosure deploys a protocol stack that supports all the targeted low energy IoT devices 110, 120, 130, 140. In accordance with exemplary embodiment, the IoT mediation and adaptation secure gateway 500 can be an application that runs in a MFP (or primary server) 200, with its own network stack, isolated and/or independent from the rest of the MFP (or server) functionality.

Figure 2:
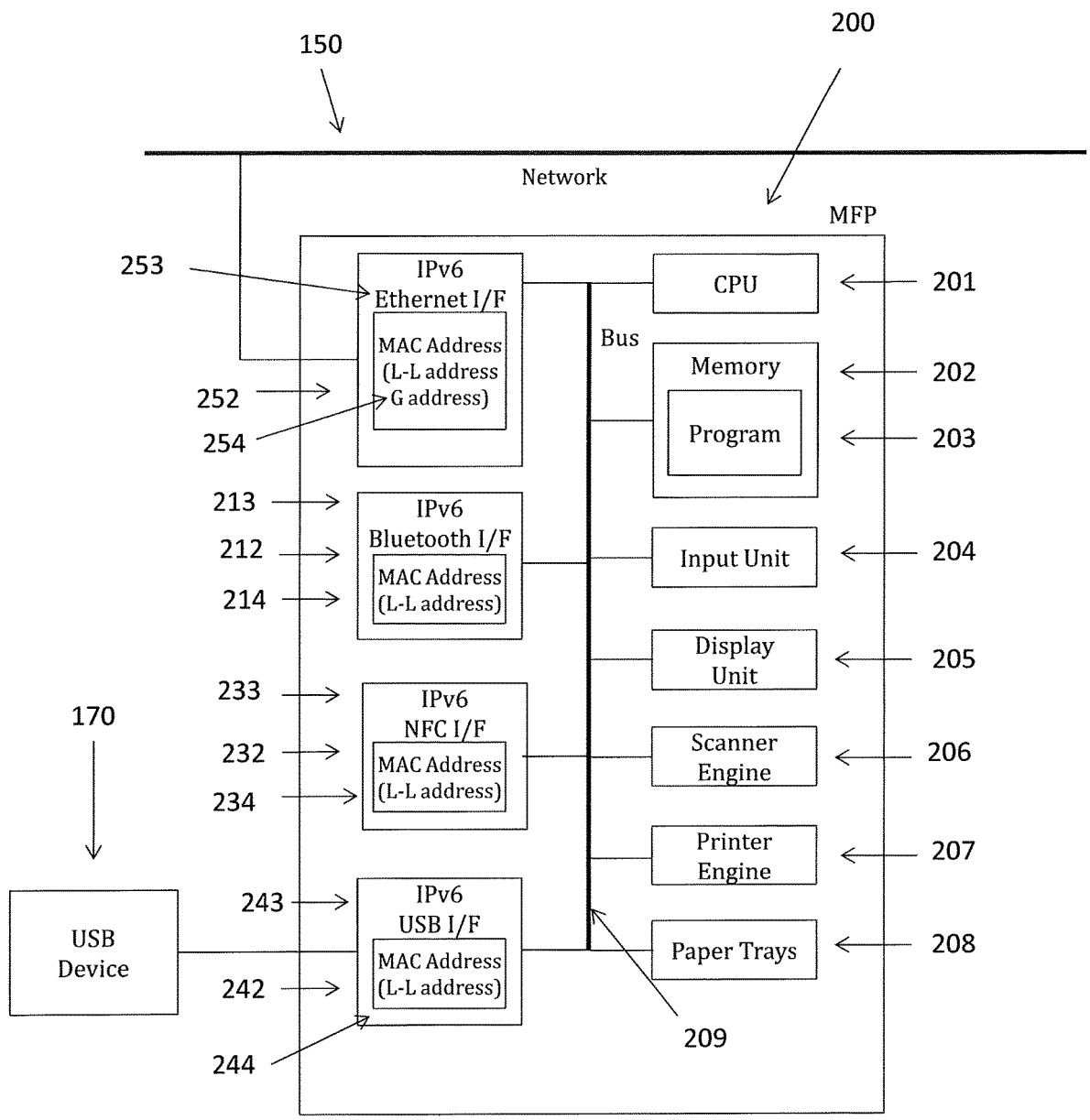
FIG. 2 is an illustration of a primary server in the form of a multi-function peripheral (MFP) having an IoT mediation and adaptation gateway in accordance with an exemplary embodiment.

FIG. 2 is an illustration of a primary server in the form of a multi-function peripheral (MFP) 200 having an IoT mediation and adaptation gateway 500 in accordance with an exemplary embodiment. As shown in FIG. 2, the MFP 200 can include a network interface (I/F) 252, for example, a IPv6 Ethernet I/F 253, which is connected to the communication network (or network) 150, a processor or central processing unit (CPU) 201, and one or more memories 202 for storing software programs and data (such as files to be printed). For example, the software programs can include a printer controller and a tray table. The processor or CPU 201 carries out the instructions of a computer program, which operates and/or controls at least a portion of the functionality of the MFP or printer 200. In accordance with an exemplary embodiment, the one or more memories 202 can include a program 203, which can include, for example, a job queue and data, for example, for color patch chart(s). The MFP 200 can also include an input unit 204, a display unit or graphical user interface (GUI) 205, a scanner engine (or scanner) 206, a printer engine 207, and one or more paper trays 208.

In accordance with an exemplary embodiment, the MFP 200 can include the Bluetooth I/F 212, for example, an IPv6 Bluetooth I/F 213, the NFC I/F 232, for example, an IPv6 NFC I/F 233, and the USB I/F 242, for example, the IPv6 USB I/F 243, which are connected, for example, via a bus 209, to the Ethernet I/F 252, for example, the IPv6 Ethernet I/F 253, which communicates via the communication network 150 to the router 160 and the one or more secondary servers 300, 310, 320. In accordance with an exemplary embodiment, the IPv6 Bluetooth I/F 213 can include a MAC address and a Link Local address 214, the IPv6 NFC I/F 232, and the USB I/F 232, for example, the IPv6 USB I/F 233.

In accordance with an exemplary embodiment, the USB I/F 232 is configured to receive a USB device 170. The USB device 170 can be any device that utilizes USB connections to connect to a computer. For example, the USB device 170 can be an external hard drive, a webcam, a printer, a scanner, a digital camera, a keyboard and/or mouse.

In accordance with an exemplary embodiment, the bus 209 can connect various components 201, 202, 204, 205, 206, 207, 208 within the MFP 200. The CPU 201 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more IoT devices 110, 120, 130, 140 and/or the one or more secondary servers 300, 310, 320 to generate, for example, a print image.

In accordance with an exemplary embodiment, an image processing section within the MFP 200 can carry out various image processing under the control of a print controller or CPU 201, and sends the processed print image data to the print engine 207. The image processing section can also include a scanner engine (scanner 206) for optically reading a document, such as an image recognition system. The scanner engine receives the image from the scanner and converts the image into a digital image. The printer engine 207 forms an image on a print media (or recording sheet) based on the image data sent from the image processing section. The central processing unit (CPU) (or processor) 201 and the memory 202 can include a program for RIP processing (Raster Image Processing), which is a process for converting print data included in a print job into Raster Image data to be used in the MPF 200 (or printer engine 207). The CPU 201 can include a printer controller configured to process the data and job information received from the one or more IoT devices (or client devices) 110, 120, 130, 140.

In accordance with an exemplary embodiment, the network I/F 252 performs data transfer with the one or more secondary servers 300, 310, 320 and the one or more IoT devices (or client devices) 110, 120, 130, 140. The printer controller can be programmed to process data and control various other components of the multi-function peripheral to carry out the various methods described herein. In accordance with an exemplary embodiment, the operation of printer section commences when the printer section receives a page description from the one or more IoT devices 110, 120, 130, 140, or the one or more secondary servers 300, 310, 320 via the network I/F 252 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of the MFP 200 consistent with exemplary embodiments of the disclosure include, but are not limited to, a multi-function peripheral (MFP), a laser beam printer (LBP), an LED printer, a multi-function laser beam printer including copy function.

Figure 3A:
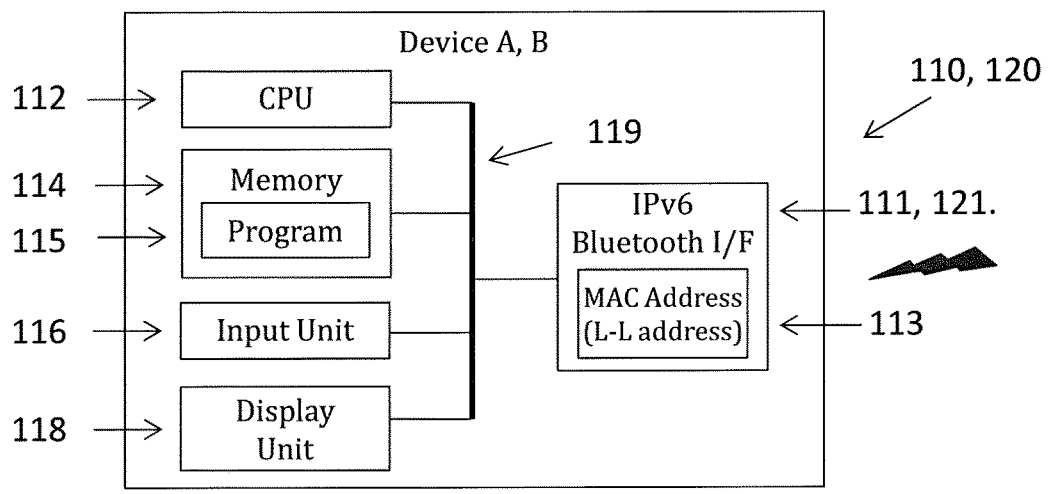
FIG. 3A is an illustration of an IoT device or client device having a Bluetooth interface (I/F) in accordance with an exemplary embodiment.

FIG. 3A is an illustration of a Bluetooth IoT device (or client device) 110, 120 in accordance with an exemplary embodiment. As shown in FIG. 3A, the Bluetooth IoT device (or client device) 110, 120 can include a processor or central processing unit (CPU) 112, and one or more memories 114 for storing software programs 115 and data (such as files to be printed), an input unit 116, a display unit 118, and an IPv6 Bluetooth I/F 111, 121 having a MAC address and link local address 113. The processor or CPU 112 carries out the instructions of a computer program, which operates and/or controls at least a portion of the functionality of the Bluetooth IoT device (or client device) 110, 120. The Bluetooth IoT device (or client device) 110, 120 includes an operating system (OS), which manages the computer hardware and provides common services for efficient execution of various software programs. A bus 119 can connect the various components 111, 112, 113, 114, 115, 116, 118 within the Bluetooth IoT device (or client device) 110, 120.

Figure 3B:
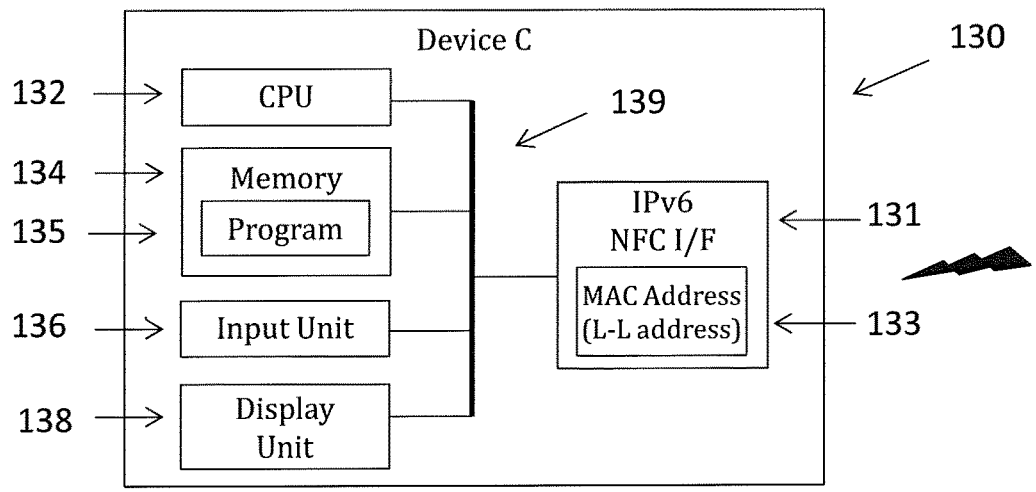
FIG. 3B is an illustration of an IoT device of client device having a near field communication interface (NFC I/F) in accordance with an exemplary embodiment.

FIG. 3B is an illustration of a NFC IoT device (or client device) 130 in accordance with an exemplary embodiment. As shown in FIG. 3B, the NFC IoT device (or client device) 130 can include a processor or central processing unit (CPU) 132, and one or more memories 134 for storing software programs 135 and data (such as files to be printed), an input unit 136, a display unit 138, and a NFC I/F 131 having a MAC address and link local address 133. The processor or CPU 132 carries out the instructions of a computer program, which operates and/or controls at least a portion of the functionality of the NFC IoT (or client device) 130. The NFC IoT device (or client device) 130 includes an operating system (OS), which manages the computer hardware and provides common services for efficient execution of various software programs. A bus 139 can connect the various components 131, 132, 133, 134, 135, 136, 138 within the NFC IoT device (or client device) 130.

Figure 3C:
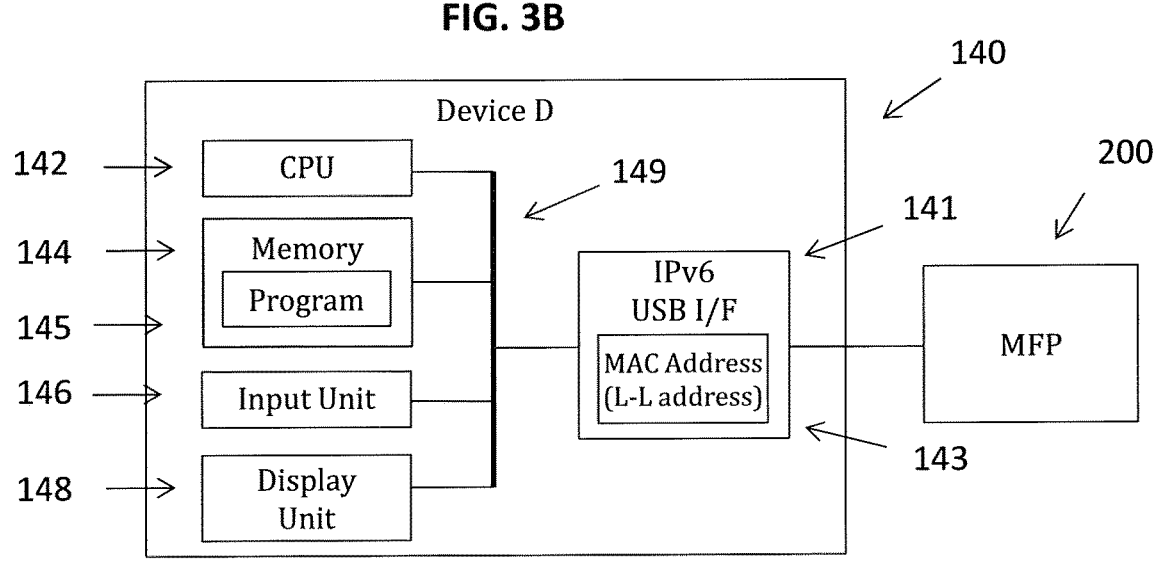
FIG. 3C is an illustration of an IoT device or client device having a Universal Serial Bus interface (USB I/F) in accordance with an exemplary embodiment.

FIG. 3C is an illustration of a USB IoT device (or client device) 140 in accordance with an exemplary embodiment. As shown in FIG. 3C, the USB IoT device (or client device) 140 can include a processor or central processing unit (CPU) 142, and one or more memories 144 for storing software programs 145 and data (such as files to be printed), an input unit 146, a display unit 148, and a USB I/F 141 having a MAC address and link local address 143. The processor or CPU 142 carries out the instructions of a computer program, which operates and/or controls at least a portion of the functionality of the USB IoT (or client device) 140. The USB IoT device (or client device) 140 includes an operating system (OS), which manages the computer hardware and provides common services for efficient execution of various software programs. A bus 149 can connect the various components 141, 142, 143, 144, 145, 146, 148 within the USB IoT device (or client device) 140.

Figure 4:
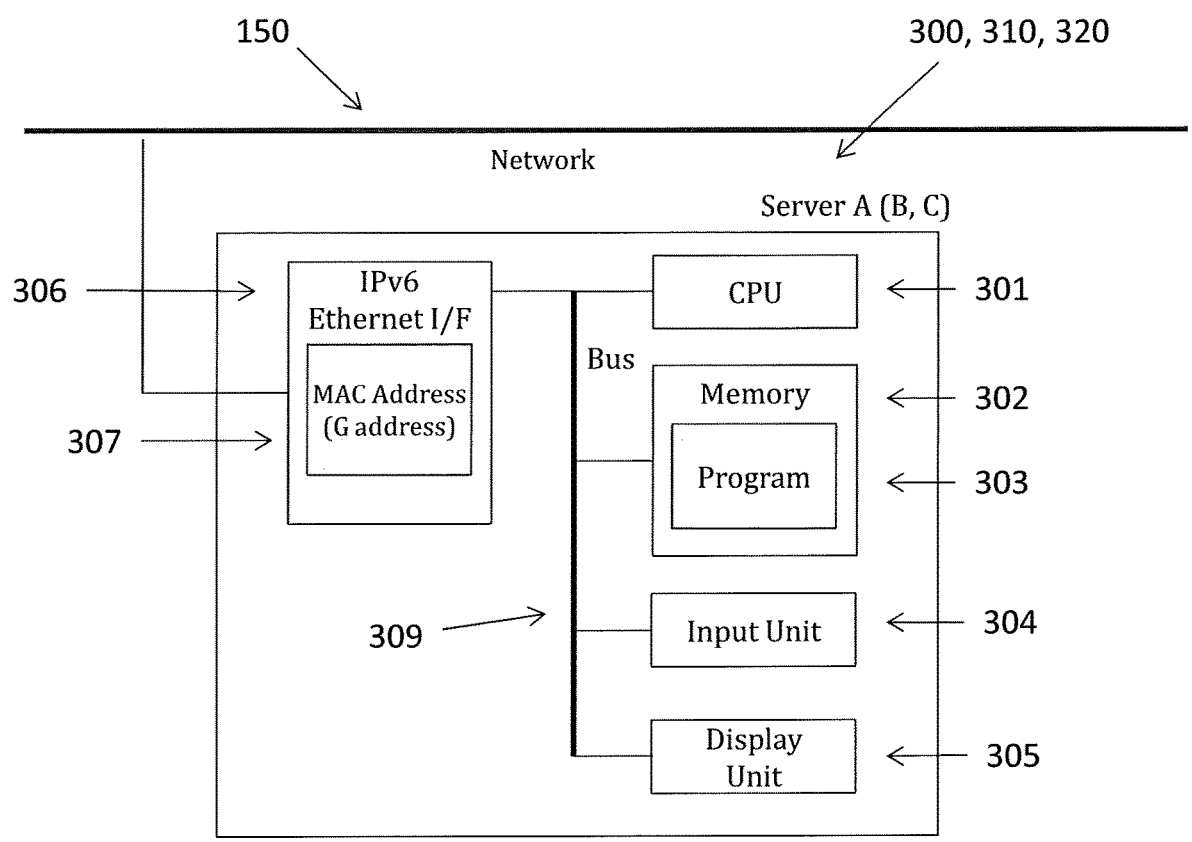
FIG. 4 is an illustration of a secondary server in accordance with an exemplary embodiment.

FIG. 4 is an illustration of a server (or secondary server) 300, 310, 320 in accordance with an exemplary embodiment. As shown in FIG. 4, the server 300, 310, 320 can include a processor or central processing unit (CPU) 301, and one or more memories 304 for storing software programs and data. The processor or CPU 301 carries out the instructions of a computer program, which operates and/or controls at least a portion of the functionality of the server 300, 310, 320. The server 300, 310, 320 can also include an input unit 304, a display unit or graphical user interface (GUI) 305, and a network interface (I/F) 306, which is connected to a communication network (or network) 150. In accordance with an exemplary embodiment, the network interface (I/F) 306 is an IPv6 Ethernet I/F with a MAC address and a Global address 307. A bus 309 can connect the various components 301, 302, 304, 305, and 306 within server 300, 310, 320. The server 300, 310, 320 includes an operating system (OS), which manages the computer hardware and provides common services for efficient execution of various software programs as disclosed herein.

Figure 5:
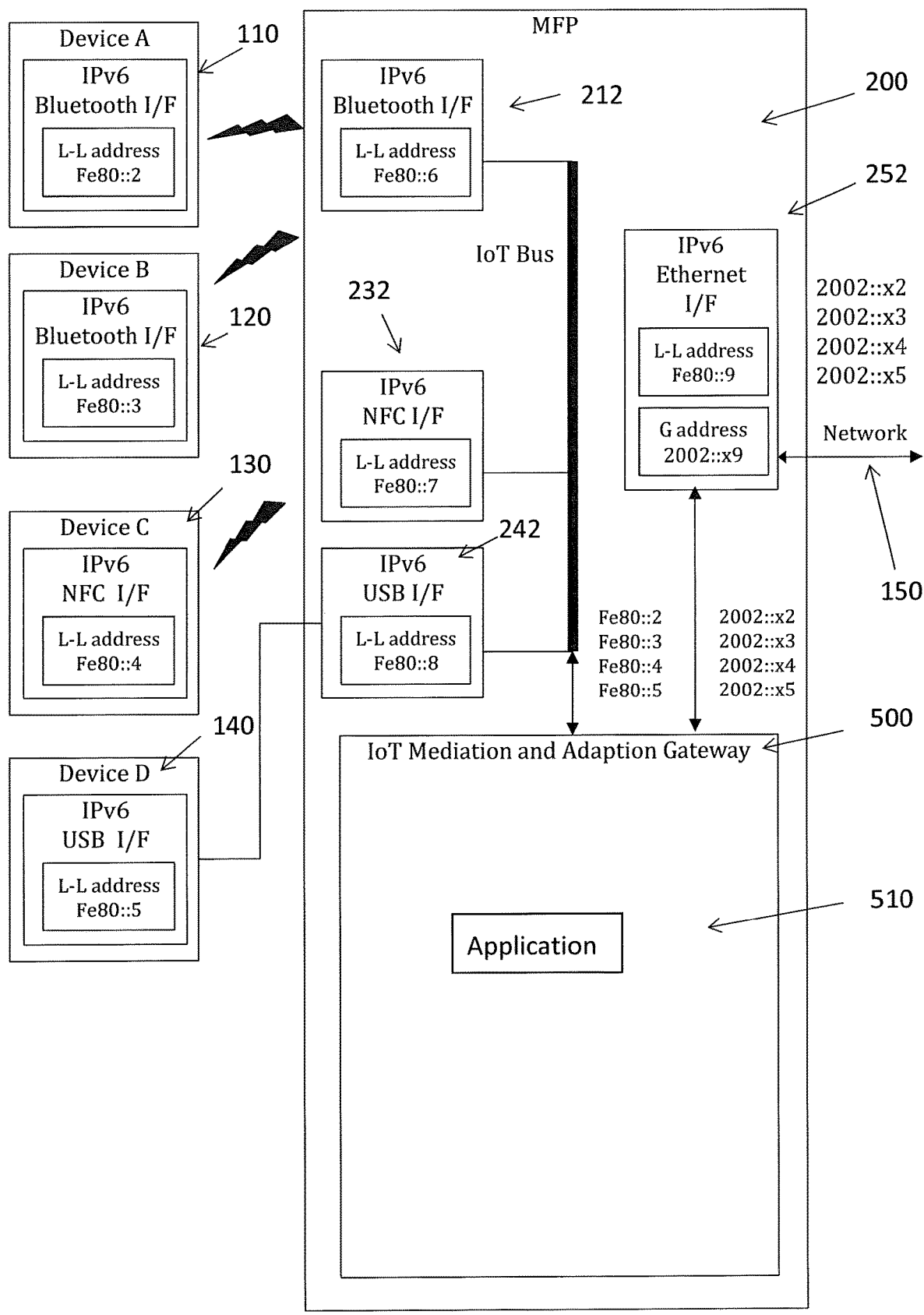
FIG. 5 is an illustration of a multi-function peripheral (MFP) having an IOT mediation and adaptation secure gateway in accordance with an exemplary embodiment.

FIG. 5 is an illustration of a MFP (or primary server) 200 having an IOT mediation and adaptation secure gateway 500 in accordance with an exemplary embodiment. As shown in FIG. 5, the IoT mediation and adaptation gateway 500 can be an application that runs in the MFP (or primary server) 200, with its own network stack, isolated and/or independent from the rest of the MFP (or primary server) functionality. In accordance with an exemplary embodiment, the IoT mediation and adaptation gateway 500 can be configured to transfer data over the Internet for IPv6-enabled IoT peripheral devices 110, 120, 130, 140. However, normally using IPv6 addressing results in a network of local peripheral devices where communication can be done over local links only. In addition, IPv6 networks having only link-local address assigned to each device, communication among IPv6 hosts can take place only on the links and cannot be routable.

However, in accordance with an exemplary embodiment, data can be transferred globally using the IoT mediation and adaptation gateway 500. The IoT mediation and adaptation gateway 500 can receive data from any of the one or more IoT device (or client devices (or hosts)) 110, 120, 130, 140 over, for example, Bluetooth LE, NFC, or USB Net technologies. In accordance with an exemplary embodiment, together with data, the IoT mediation and adaptation gateway 500 receives information about the destination IP address and link-local address of the IoT device (or client or host device) 110, 120, 130, 140. In addition, depending on the application messaging protocol, the IoT mediation and adaptation gateway 500 can make decisions if the received data can be transmitted locally or globally (for example, see FIG. 8, which is an example of a data packet 800 received from an IoT device 110, 120, 130, 140). In accordance with an exemplary embodiment, if the data received from the IoT device 110, 120, 130, 140 needs to be transmitted locally, the IoT mediation and adaptation gateway 500 can forward the data to the local destination over the local link.

In accordance with an exemplary embodiment, in the case where the received data has to be transmitted globally, the IoT mediation and adaptation gateway 500 will use an application 510, which can convert a link-local address into a global IP address, for example, as disclosed in U.S. Pat. No. 8,516,141, which is incorporated herein in its entirety. After the conversion of the link-local address into the global IP address has been performed, the IPv6 packets with data become routable and can be delivered to the destination, for example, to the one or more secondary servers 300, 310, 320, via the Internet 150. In accordance with an exemplary embodiment, when the destination, for example, the one or more of the secondary servers 300, 310, 320 sends a response back to the IoT device 110, 120, 130, 140 (or client device or host), the one or more secondary servers 300, 310, 320 will send the response back to the global IP address which was received as a result of the conversion of the link-local address.

In accordance with an exemplary embodiment, all of the Internet traffic is exchanged between the global address (or global IP address) received after the conversion of the link-local address of the IoT devices (or client device or host) 110, 120, 130, 140, and the IP address of the destination, for example, the one or more secondary servers 300, 310, 320. Thus, in accordance with an exemplary embodiment, the IoT devices (or client device or hosts) 110, 120, 130, 140 are not exposed to any danger of cyber-attacks and can keep their data relatively protected at all times. In addition, the possibilities of cyber-attack can be eliminated and data protection can be significantly increased. Moreover, the low power IoT devices 110, 120, 130, 140 in the above described network can reduce their power consumption by transferring data to/from the IoT mediation and adaptation gateway 500, which results in the transfer of the data being done independent of the IoT devices 110, 120, 130, 140. In addition, as a result, this type of network arrangement can be more efficient in terms of reducing power consumption for many low power IoT devices 110, 120, 130, 140, such as home automation, smart energy, health and fitness, etc.

In accordance with an exemplary embodiment, for example, a table (or database) can be used to maintain records of the IoT devices (or peripheral devices) 110, 120, 130, 140 using the IoT mediation and adaptation gateway 500, for example, as shown in FIGS. 11 and 13-16. In accordance with an exemplary, as shown in FIGS. 11 and 13-16, the following entries may be necessary or required for operation of the application 510 of the IoT mediation and adaptation gateway 500, link-local address of the IoT device (or peripheral device) 110, 120, 130, 140, global IP address (received after the conversion of the link-local address of the IoT device 110, 120, 130, 140 (or peripheral device) into the global IP address), destination address, and application communication protocol (used to distinguish if data received from the IoT device (or peripheral device) 110, 120, 130, 140 is IoT data).

In accordance with an exemplary embodiment, when the IoT device (or peripheral device) 110, 120, 130, 140 sends data to a specific destination, for example, one of the one or more secondary servers 300, 310, 320, an application 510 within the IoT mediation and adaptation gateway 500 receives the link-local address of the IoT device (or peripheral device) 110, 120, 130, 140 and a destination IP address. The application 510 can store the received information into a table (or database) along with the application communication protocol. Next, the application 510 checks which application communication protocol is used for data transfer. If an IoT protocol is used, the application 510 converts the received link-local address into a global address (or global IP address), stores the calculated address into the table and performs data transfer to the destination, for example, one or more of the secondary servers 300, 310, 320 via the network 150. When the destination, for example, the one or more secondary server 300, 310, 320 sends a response to the application 510, the application 510 uses the table (or database) to look up which link-local address is associated with the requested global address. As a result, the application sends the response back to the original IoT device (or peripheral device) 110, 120, 130, 140.

Figure 6:
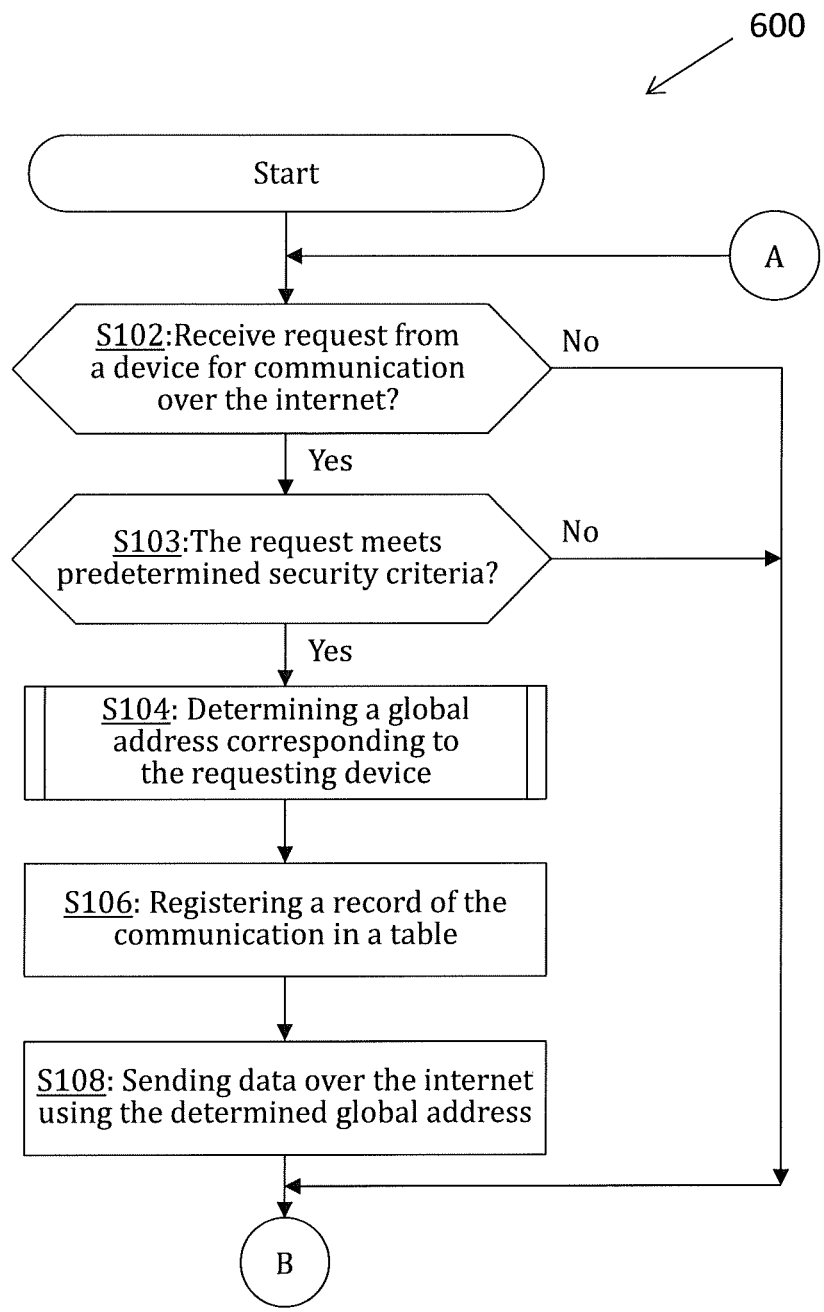
FIG. 6 is a flow chart illustrating a process on the IoT mediation and adaptation gateway for sending data over a communication network over a communication network in accordance with an exemplary embodiment.
Figure 7:
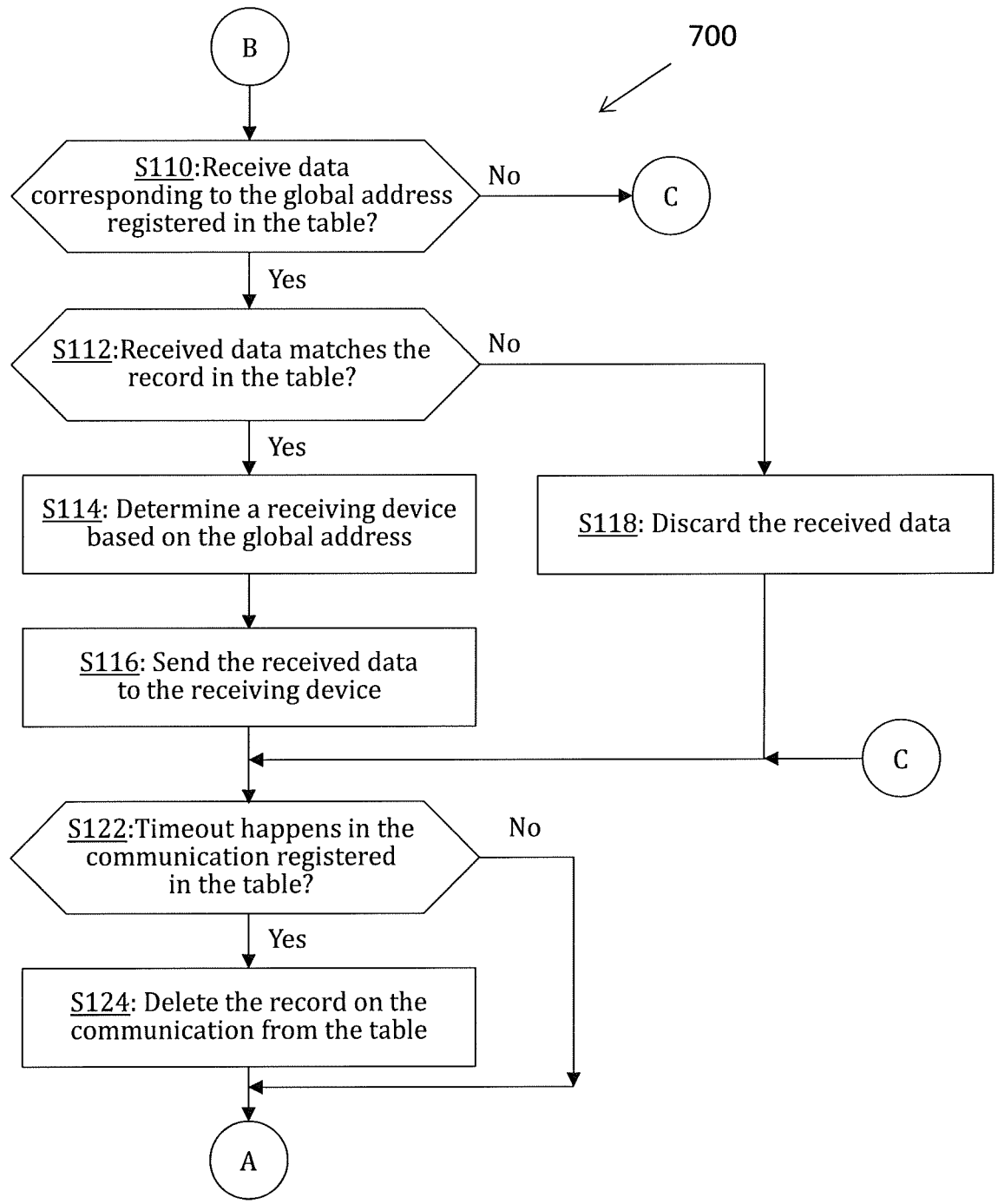
FIG. 7 is a flow chart further illustrating the process on the IoT mediation and adaptation gateway as shown in FIG. 6 for sending data over a communication network in accordance with an exemplary embodiment.

FIG. 6 is a flow chart illustrating a process 600 on the IoT mediation and adaptation gateway 500 for sending data over a communication network 150 in accordance with an exemplary embodiment. As shown in FIG. 6, in step S102, the application 510 on the IoT mediation and adaptation gateway 500 receives a request from a device, for example, an IoT device 110, 120, 130, 140, and determines if the request includes a request for communication over the Internet 150. In step S102, if the request does not include a request for communication over the Internet 150, the process continues to step S110 (FIG. 7). In step S102, if the request does include a request for communication over the Internet 150, the process continues to S103, wherein a determination is made, if the request meets a predetermined security criterion. In accordance with an exemplary embodiment, the predetermined security criterion can be, for example, a set of rules and/or policies set by an administrator, for example, pre-approved IoT devices 110, 120, 130, 140, pre-approved MAC address, and/or type of data, which may be exchanged over the Network 150.

In step S103, if the request does not meet the predetermined security criterion, the process continues to step S110. If the request meets the predetermined security criterion, the process continues to step S104, where the application 510 can determine (or assign) a global address (global IP address) corresponding the requesting IoT device 110, 120, 130, 140. In step S106, the global address determined (or assigned) to the requesting IoT device 110, 120, 130, 140 is recorded or registered in a table (or database), for example, as illustrated in FIGS. 13-16. In step S108, the IoT mediation and adaptation gateway 500 sends the data via the IPv6 Ethernet I/F 252 over the Internet 150 to, for example, one or more of the secondary servers 300, 310, 320.

FIG. 7 is a flow chart further illustrating the process on the IoT mediation and adaptation gateway 500 as shown in FIG. 6 for sending data over a communication network 150 in accordance with an exemplary embodiment. As shown in FIG. 7, in step S110, the application 510 on the IoT mediation and adaptation gateway 500 determines if the data received corresponds to a global address (or global IP address) registered in a table (or database) 1300, 1400, 1500, 1600, for example, as shown in FIGS. 13-16. In step S110, if the data received does not correspond to a global address registered in the table (or database) 1300, 1400, 1500, 1600 as shown in FIGS. 13-16, the process continues to step S122. If the global address is registered in the table (or database) 1300, 1400, 1500, 1600, for example, as shown in FIGS. 13-16, the process continues to step S112, where a determination is made if the received data matches the record in the table (or database). If the data received does not match the record in the table, the process continues to step S118, where the received data is discarded (or dropped).

In accordance with an exemplary with an exemplary embodiment, in step S112, if the received data matches the address recorded in the table (or database) 1300, 1400, 1500, 1600, as shown in FIGS. 13-16, the process continues to step S114, in which a determination is made based on the global address to determine a corresponding IoT device (receiving device) 110, 120, 130, 140. In step S116, the received data is sent to the corresponding IoT device (receiving device) 110, 120, 130, 140.

In accordance with an exemplary embodiment, in step S122, once a communication is registered in the table (or database) 1300, 1400, 1500, 1600 as shown in FIGS. 13-16, a determination can be made if a predetermined time frame or time period has elapsed since the last communication. If the predetermined time frame or time period has not elapsed, for example, milliseconds (ms), the process continues to step S102. If in step S122, the time period or time frame has elapsed, the process continues to step S124, where the record of the communication is deleted from the table, and the process returns to step S102.

Figure 8:
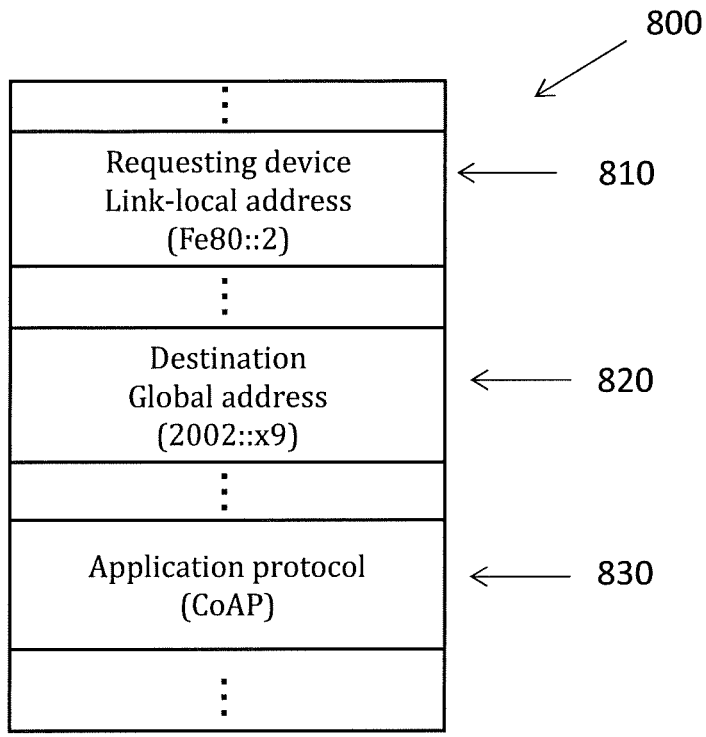
FIG. 8 is an example of a data packet received from an IoT device or client device in accordance with an exemplary embodiment.

FIG. 8 is an example of a data packet 800 received from an IoT device 110, 120, 130, 140 in accordance with an exemplary embodiment. As shown in FIG. 8, the data packet includes a link-local address (for example, Fe80::2) 810 for the IoT device 110, 120, 130, 140, a global address 820 of a destination device (for example, one or more servers 300, 310, 320), and an application protocol 830, for example, constrained application protocol (CoAp), MQ Telemetry Transport or Message Queue Telemetry Transport (MQTT), or Advanced Message Queuing Protocol (AMQP).

Figure 9:
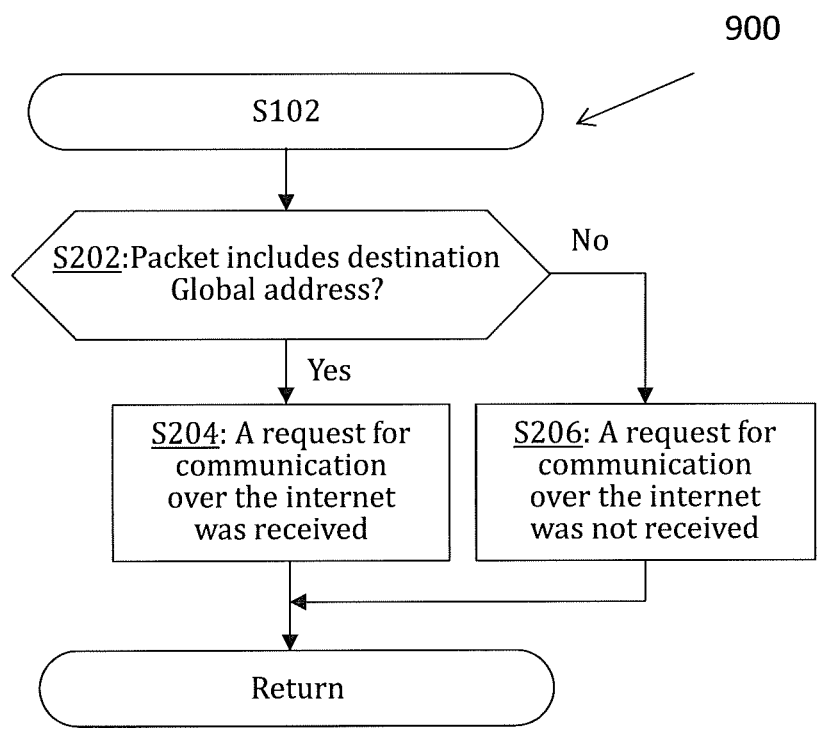
FIG. 9 is a flow chart illustrating a method of processing a data packet received from an IoT device in accordance with an exemplary embodiment.

FIG. 9 is a flow chart illustrating a method of processing a data packet 800 received from an IoT device 110, 120, 130, 140 in accordance with an exemplary embodiment. As shown in FIG. 9, in step S202, the packet 800 is received on the application 510 of the IoT mediation and adaptation gateway 500 (from step S102), and a determination is made if the packet 800 includes a destination global address 820. If the packet includes a destination global address 820, the application 510 in step S204 can determine that the packet 800 includes a request for communication over the Internet 150. However, if the packet does not include a destination global address 820, the application in S206 can determine that the packet 800 does not include a request for communication over the Internet 150.

Figures 10, 11:
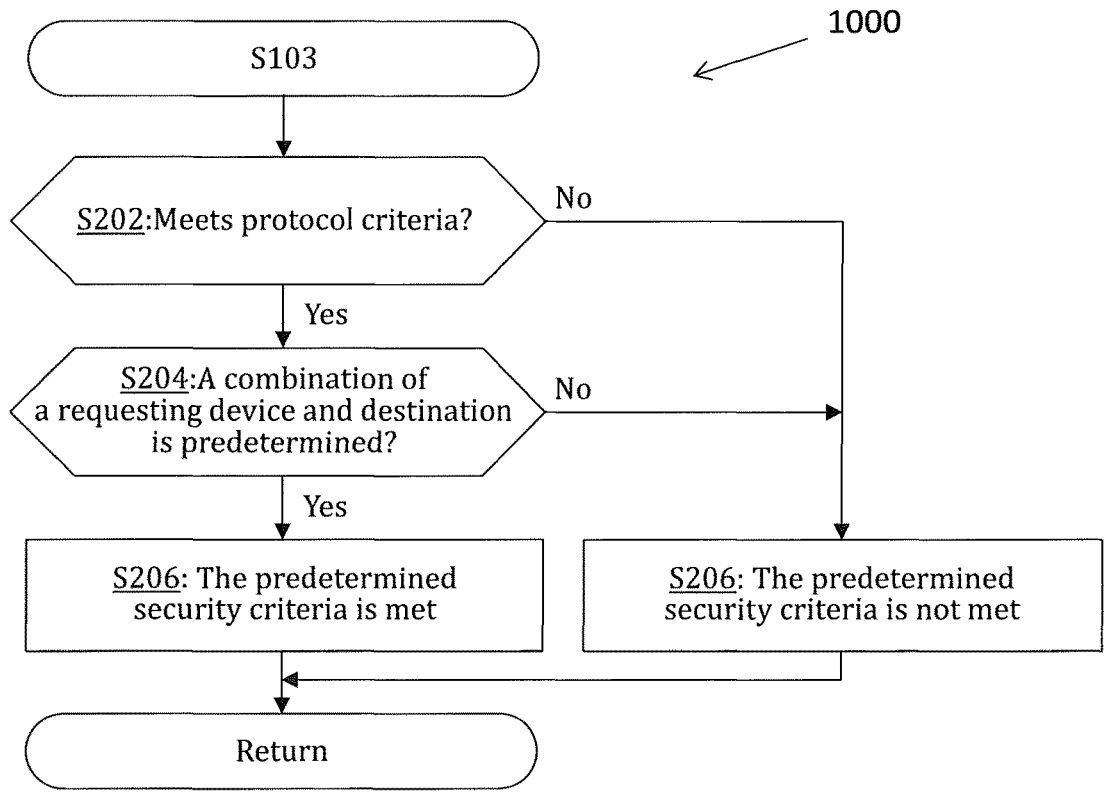
FIG. 10 is a flow chart illustrating a process of determining if a data packet meets a predetermined security criteria (or protocol criteria) in accordance with an exemplary embodiment.
FIG. 11 is a table for determining if the data packet from the IoT device meets predetermined security criteria in accordance with an exemplary embodiment.

FIG. 10 is a flow chart illustrating a process 1000 of determining if a data packet 800 meets a protocol criteria in accordance with an exemplary embodiment. As shown in FIG. 10, once the packet 800 is received by the application 510 (from step S103), in step S202, the application 510 can determine if the request within the data packet meets a protocol criterion set by the administrator. In accordance with an exemplary embodiment, the protocol criteria, for example, can be an application protocol 830, for example, constrained application protocol (CoAp), MQ Telemetry Transport or Message Queue Telemetry Transport (MQTT), or Advanced Message Queuing Protocol (AMQP). In step S202, if the packet meets the protocol criteria in step S202, the process continues to step S204, for a determination, if the request meets both the type of IoT device and the destination, for example, one or more of the secondary servers 300, 310, 320. If in step S204, the request in the data packet 800 meets both the type of IoT device and the destination, the process continues to step S206, in which the packet is identified as having met the predetermined security criteria. In step S202, if the packet 800 does not meet the protocol criteria, the process continues to step S206, where the data packet is identified as not meeting the security criteria (i.e., protocol criteria). In step S204, if the packet 800 does not meet the IoT device criteria and the destination criteria, the process continues to step S206 and the packet is identified as not have met the security criteria.

FIG. 11 is a table (or database) 1100 for determining if the data packet from the IoT device 110, 120, 130 meets a predetermined security criteria as set forth in step S103 (FIG. 10) in accordance with an exemplary embodiment. For example, as shown in FIG. 11, the table can include a listing of requesting devices (for example, an IoT devices 110, 120, 130, 140), each of the requesting devices having a link-local address 810. In addition, the data packet 800 can include a protocol 830 for the data request 800 and a destination address 820.

Figure 12:
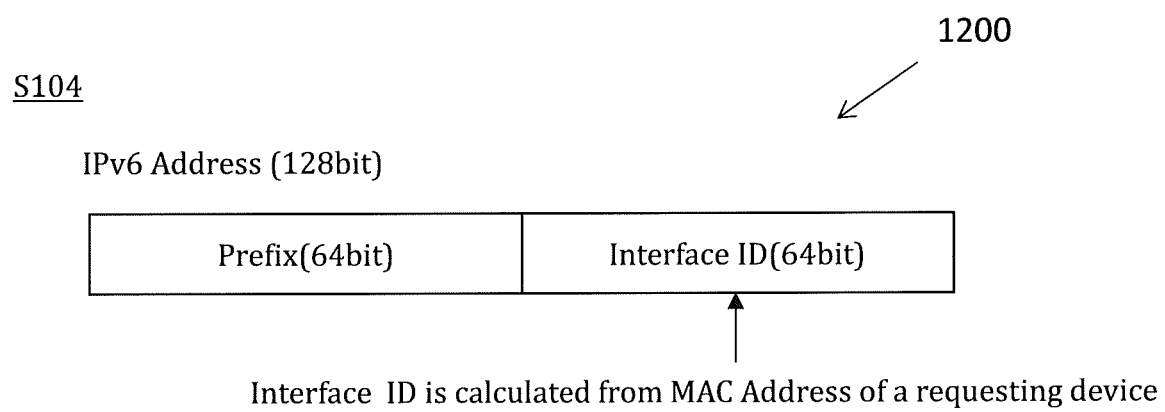
FIG. 12 is an example of an IPv6 address (or global IP address) in accordance with an exemplary embodiment.

FIG. 12 is an example of an IPv6 address 1200 as set forth in step S104 (FIG. 6) in accordance with an exemplary embodiment. As shown in FIG. 12, the IPv6 address can be 128 bit, which includes a Prefix (64 bit) and an Interface ID (64 bit). The Interface ID is calculated from the MAC address of the requesting device (or IoT device 110, 120, 130, 140).

FIG. 13 is a table (or database) for recording (or managing) communications from an IoT device 110, 120, 130, 140, in accordance with an exemplary embodiment. As shown in FIG. 13, the application 510 receives data packets 800 from the IoT device 110, 120, 130, 140, each of the data packets 800 having a link-local address 1310, an assigned global address 1320, a destination address (optional) 1330, a current application protocol 1340, and inactive time 1350.

FIG. 14 is a table (or database) 1400 for recording communications from an IoT device 110, 120, 130, 140 and determination of a global address in accordance with another exemplary embodiment. As shown in FIG. 14, each of the one or more IoT devices 110, 120, 130, 140 has a link-local address 1410, a receiving I/F link local address 1420, and a determined global address 1440. In addition, the MFP 200 has a global address 1420. In accordance with an exemplary embodiment, each of the one or more IoT devices 110, 120, 130, 140 can have a unique global address determined 1440 based on the link-local address of each of the corresponding IoT devices 110, 120, 130, 140.

FIG. 15 is a table (or database) 1500 for recording communications from an IoT device 110, 120, 130, 140 in accordance with a further exemplary embodiment. As shown in FIG. 15, each of the one or more IoT devices 110, 120, 130, 140 has a link-local address 1410, a receiving I/F link local address 1420, and a determined global address 1440. In addition, the MFP 200 has a global address 1420. In accordance with an exemplary embodiment, each of the one or more IoT devices 110, 120, 130, 140 can have a unique global address determined 1540 based on the received I/F link-local address of each of the corresponding IoT devices 110, 120, 130, 140.

FIG. 16 is a table (or database) 1600 for recording communications from an IoT device 110, 120, 130, 140 in accordance with an exemplary embodiment. As shown in FIG. 16, the IoT devices 110, 120, 130, 140 has a link-local address 1410, a receiving I/F link local address 1420, and a determined global address 1440. In addition, the MFP 200 has a global address 1420. In accordance with an exemplary embodiment, the IoT devices 110, 120, 130, 140 can have a unique global address determined 1420 based on the global address of the MFP.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transferring data over a communication network from an Internet of Things (IoT) device, the method comprising:
receiving a data packet from the IoT device on an IoT application running on a primary server, the data packet having a stateless autoconfiguration IPv6 address, which is configured at least partially based on a device identifier assigned to the IoT device;
transferring the data packet from the IoT application to an IoT mediation and adaption gateway application via an IoT bus;
modifying the stateless autoconfiguration IPv6 address associated with the IoT device identifier to generate a global IP address with the IoT mediation and adaption gateway application running on the primary server;
transferring the data packet with the global IP address from the IoT mediation and adaption gateway application to an IPv6 interface on the primary server; and
sending the data packet with the global IP address from the primary server to one or more secondary servers over the communication network.

2. The method of claim 1, comprising:
exchanging the data packet between the IoT device and the IoT application on the primary server via a communication protocol, the communication protocol being Bluetooth®, Near-Field Communication (NFC), or Universal Serial Bus (USB).

3. The method of claim 2, comprising:
sending the data packet from the IoT device to the IoT application on the primary server via constrained application protocol (CoAp), MQ Telemetry Transport or Message Queue Telemetry Transport (MQTT), or Advanced Message Queuing Protocol (AMQP).

4. The method of claim 2, comprising:
exchanging the data packet between the IoT device and the IoT application on the primary server via an IPv6 over Low-Power Wireless Personal Area Networks (6LoWPAN) layer in a protocol stack of the IoT device.

5. The method of claim 1, wherein the communication network is the Internet and the primary server is a multi-function peripheral (MFP).

6. The method of claim 1, further comprising:
determining, by the IoT mediation and adaption gateway application, if the data packet is received from an approved IoT device before the assigning the global IP address to the data packet and the sending of the data packet to the one or more secondary servers over the communication network.

7. The method of claim 1, further comprising:
recording the global IP address in a database in the IoT mediation and adaption gateway application; and
forwarding data received from the one or more secondary servers to the IoT device based on the recorded global IP address.

8. The method of claim 1, further comprising:
assigning the global IP address to the IoT device based with a link-local address of the IoT device, a link-local address of a receiving interface (I/F) of the primary server, or a global IP address of the primary server.

9. A non-transitory computer readable medium containing a computer program for transferring data over a communication network from an Internet of Things (IoT) device, wherein the computer program comprises executable instructions for:
receiving a data packet from the IoT device on an IoT application running on a primary server, the data packet having a stateless autoconfiguration IPv6 address, which is configured at least partially based on a device identifier assigned to the IoT device;
transferring the data packet from the IoT application to an IoT mediation and adaption gateway application via an IPv6 only IoT bus;
modifying the stateless autoconfiguration IPv6 address associated with the IoT device identifier to generate a global IP address with the IoT mediation and adaption gateway application running on the primary server;
transferring the data packet with the global IP address from the IoT mediation and adaption gateway application to an IPv6 interface on the primary server; and
sending the data packet with the global IP address from the primary server to one or more secondary servers over the communication network.

10. The non-transitory computer readable medium of claim 9, comprising:
exchanging the data packet between the IoT device and the IoT application on the primary server via a communication protocol, the communication protocol being Bluetooth®, Near-Field Communication (NFC), or Universal Serial Bus (USB).

11. The non-transitory computer readable medium of claim 10, comprising:
sending the data packet from the IoT device to the IoT application on the primary server via constrained application protocol (CoAp), MQ Telemetry Transport or Message Queue Telemetry Transport (MQTT), or Advanced Message Queuing Protocol (AMQP).

12. The non-transitory computer readable medium of claim 10, comprising:
exchanging the data packet between the IoT device and the IoT application on the primary server via an IPv6 over Low-Power Wireless Personal Area Networks (6LoWPAN) layer in a protocol stack of the IoT device.

13. The non-transitory computer readable medium of claim 9, wherein the communication network is the Internet and the primary server is a multi-function peripheral (MFP).

14. The non-transitory computer readable medium of claim 9, further comprising:
determining, by the IoT mediation and adaption gateway application, if the data packet is received from an approved IoT device before the assigning the global IP address to the data packet and the sending of the data packet to the one or more secondary servers over the communication network.

15. A primary server configured to implement a method of for transferring data over a communication network from an Internet of Things (IoT) device, the primary server having an application configured to:
receive a data packet from the IoT device on an IoT application running on a primary server, the data packet having a stateless autoconfiguration IPv6 address, which is configured at least partially based on a device identifier assigned to the IoT device;

transfer the data packet from the IoT application to an IoT mediation and adaption gateway application via an IoT bus;

modify the stateless autoconfiguration IPv6 address associated with the IoT device identifier to generate a global IP address with the IoT mediation and adaption gateway application running on the primary server;

transfer the data packet with the global IP address from the IoT mediation and adaption gateway application to an IPv6 interface on the primary server; and send the data packet with the global IP address from the primary server to one or more secondary servers over the communication network.

16. The primary server of claim 15, further comprising: exchanging the data packet between the IoT device and the IoT application on the primary server via a communication protocol, the communication protocol being Bluetooth®, Near-Field Communication (NFC), or Universal Serial Bus (USB).

17. The primary server of claim 16, wherein the data packet is send from the IoT device to the IoT application on the primary server pursuant to a constrained application protocol (CoAp), MQ Telemetry Transport or Message Queue Telemetry Transport (MQTT), or Advanced Message Queuing Protocol (AMQP).

18. The primary server of claim 16, wherein the data packet is received by the IoT application on the primary server from the IoT device via an IPv6 over Low-Power Wireless Personal Area Networks (6LoWPAN) layer in a protocol stack of the IoT device.

19. The primary server of claim 15, wherein the communication network is the Internet and the primary server is a multi-function peripheral (MFP).

20. The primary server of claim 15, wherein the IoT mediation and adaption gateway application is configured to:

determine if the data packet is received from an approved IoT device before the assigning of the global IP address to the data packet and the sending of the data packet to the one or more secondary servers over the communication network.

* * * * *